Patented Nov. 5, 1940

2,220,065

UNITED STATES PATENT OFFICE 2,220,065

AMINOPHENOLS AND THEIR PREPARATION

Richard G. Clarkson, Wilmington, Del., assignor to E. I. du Pont de Nemours & Company, Wilmington, Del., a corporation of Delaware No Drawing. Application October 29, 1938,
Serial No. 237,749

13 Claims. (Cl. 260—566)

This invention relates to new chemical compounds and methods for preparing the same, and particularly to new N-substituted aminophenols.

Many attempts have been made to produce N-alkylidene phenols by condensing normal aliphatic aldehydes, such as acetaldehyde and n-butyl aldehyde, with primary aminophenols. These processes have not proved to be commercially successful for the reason that the reaction products are usually amorphous or tarry products of indefinite constitution which behave as polymerization products and show few, if any, of the properties of N-alkylidene aminophenols. They apparently consist primarily of polymerized condensation products rather than the simple alkylidene aminophenols. They do not reduce cleanly to N-alkyl aminophenols. Any alkylidene aminophenol, as thus produced is quite unstable and readily polymerizes or hydrolyzes rapidly, rendering it extremely difficult, if not impossible, to isolate the alkylidene aminophenol.

It is an object of my invention to produce a new class of alkylidene aminophenols which are sufficiently stable so that they can be isolated in substantially pure form and stored for long periods of time without decomposition, polymerization or hydrolysis. A further object is to provide a method for producing relatively stable alkylidene aminophenols in substantially pure form and in high yields by condensing aliphatic aldehydes with primary aminophenols. The alkylidene aminophenols of my invention may be hydrogenated to produce the corresponding alkyl aminophenols which are new compositions of matter, and it is a still further object of my invention to produce such new alkyl aminophenols. Other objects are to provide new compositions of matter and to advance the art. Still other objects will appear hereinafter.

The above and other objects may be accomplished in accordance with my invention, in which 1 mole of an a-isoalkyl aldehyde is condensed with 1 mole of a primary aminophenol to produce an N-($\alpha$-isoalkylidene)aminophenol. Such N-($\alpha$-isoalkylidene)aminophenols are new chemical compounds, not known heretofore, and they may be reduced to produce the corresponding N-($\alpha$-isoalkyl)aminophenols which are also new chemical compounds not known heretofore.

According to the English system of numbering, the carbon atom attached to the CHO group of an aliphatic aldehyde is known as the alpha carbon atom. The terms "iso" denotes a branched-chain compound. Accordingly, the term "a-isoalkly-aldehyde" as used herein and in the claims denotes an aliphatic aldehyde in which at least two alkyl groups are attached to the carbon atom next to the CHO group. These aldehydes may be represented by the formula

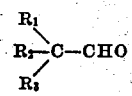

wherein $R_1$ and $R_2$ represent alkyl groups and $R_3$ represents hydrogen or an alkyl group. These aldehydes necessarily contain at least four carbon atoms.

The N-($\alpha$-isoalkylidene)aminophenols are accordingly the alkylidene aminophenols in which the alkylidene radical has the same structure as the aldehyde from which it is derived. Such N-($\alpha$-isoalkylidene)aminophenols may be represented by the following formula

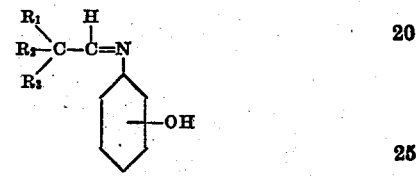

in which $R_1$ and $R_2$ represent alkyl radicals and $R_3$ represents hydrogen or an alkyl radical. The term N-($\alpha$-isoalkyl)aminophenol will accordingly denote the alkyl aminophenol corresponding to the N ($\alpha$-isoalkylidene)aminophenol. The N-($\alpha$-isoalkyl)aminophenol will correspond to the formula

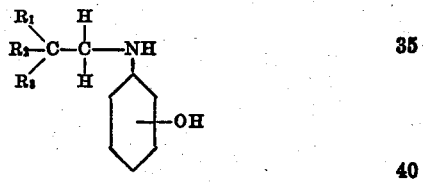

in which $R_1$ and $R_2$ represent alkyl radicals and $R_3$ represents hydrogen or an alkyl radical.

I have found that, when an a-isoalkyl aldehyde is admixed with a primary aminophenol, particularly in an aqueous solvent, the aldehyde and aminophenol will condense in equimolecular proportions to produce high yields of substantially pure N-($\alpha$-isoalkylidene)aminophenol which is relatively stable and can be stored for relatively long periods of time. The condensation will take place at low temperatures, such as room temperatures, and at temperatures as high as 125° C. without material polymerization of either the aldehyde or the alkylidene aminophenol. Above 125° C., there is a greater tendency for polymerization to take place and hence it is preferable not to use such higher temperatures. Preferably, temperatures of from about 50° C. to the boiling point of the solvent employed are used. The resulting N-(α-isoalkylidene)aminophenol decomposes slowly in the atmosphere at room temperature, but may be stored for long periods of time, in the absence of water vapor and in an inert atmosphere such as an atmosphere of nitrogen, without appreciable hydrolysis, decomposition or polymerization.

In carrying out the reaction, it is preferable to employ a slight excess of aldehyde and preferably from 1.1 to 1.2 moles are used for each mole of aminophenol. It will be found practical to use from about 1 to about 1.5 moles of aldehyde to each mole of aminophenol. Larger or smaller amounts of aldehyde may be used, but without substantial advantage. A lesser amount of aldehyde will necessarily leave unreacted aminophenol to be separated from the desired product. Larger amounts of aldehyde provide an unnecessary excess of aldehyde to be removed from the reaction product.

Preferably, the solvent employed is an aqueous alcoholic solution, which may contain a small amount of acetic acid. Water may be employed in place of the alcohol. Aqueous solvents, in general, will be found to be satisfactory. It is not essential that acid be used, and it is even possible to use hydrocarbon solvents such as benzene, toluene and aliphatic hydrocarbon solvents such as gasoline. The amount of solvent employed should preferably be kept as small as possible since it is preferable to recover the alkylidene aminophenol by precipitation or crystallization from the solvent. Preferably, the amount of solvent employed will be just sufficient to dissolve or disperse the primary aminophenol so as to produce a solution or mixture which is sufficiently liquid to permit ready mixing of the aldehyde therewith.

The resulting alkylidene aminophenols of my invention may be reduced to produce the corresponding N-alkyl aminophenols which are new chemical compounds. Either catalytic or chemical methods of reducing the alkylidene aminophenols may be employed. Chemical reduction may be accomplished by means of zinc and caustic. Catalytic reduction may be accomplished by hydrogenating the alkylidene aminophenol in the presence of a suitable catalyst, such as active nickel on kieselguhr. The catalytic method will generally be preferred.

The N-alkyl aminophenols of my invention may be prepared by other methods, such as reacting the corresponding alkyl halide with an aminophenol. The N-alkyl aminophenols of my invention may be also produced by reacting an alpha halogenated aliphatic acid with the aminophenol and then decarboxylating the glycine derivative obtained. They may also be produced by reacting the corresponding aliphatic amine with a polyhydric phenol.

The aminophenol may be of the benzene, naphthalene, anthracene, phenanthrene, diphenyl or like series. The aromatic radical may be substituted by alkyl groups, halogen atoms, amino groups or alkoxy groups. My invention is preferably directed to the aminophenols in which any substituents on the aromatic ring, other than the amino and hydroxyl radicals, consist of hydrocarbon radicals; that is, the aminophenols in which the aromatic radical is free of substituents or contains alkyl radicals. Also, the preferred aminophenols of my invention are those of the benzene series.

In order to illustrate my invention more clearly, together with the preferred modes of carrying the same into effect and the advantageous results to be obtained thereby, the following examples are given in which the parts are by weight unless otherwise specifically stated.

EXAMPLE 1.—*N-isobutyral-p-aminophenol*

158 parts of isobutyraldehyde was rapidly added with stirring to 218 parts of p-aminophenol suspended in 1,000 parts by volume of 50% alcohol at 55° C. The temperature of the reaction mixture increased to 66° C., the p-aminophenol dissolved, and a precipitate promptly formed. The reaction mixture was stirred for about 5 minutes in order to insure completion of the reaction and was then cooled by immersion in ice water and filtered. The precipitate was washed with a little 50% alcohol and dried in a slow stream of air at room temperature. The dry product was 287 parts of N-isobutyral-p-amino phenol as pearl-colored plates, (M. P. 143–147° C.), containing 8.69% N. The theory for N-isobutyral-p-aminophenol ($C_{10}H_{13}ON$) is 8.58% N. The product has the formula

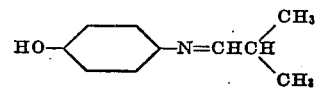

This Schiff's base is very insoluble in water, moderately soluble in benzene or toluene and very soluble in alcohol, acetone, ethyl acetate or dioxane. It may be prepared in any of these solvents. It sublimes rapidly in vacuo at about 130° C. and distills with some decomposition at 180–195° C./0.5 mm. It decomposes slowly on standing in air at room temperature, and is preferably stored in the absence of water vapor and in an inert atmosphere such as nitrogen. Under the latter conditions, it may be stored for long periods of time without appreciable alteration.

The identity of the product was confirmed by reduction to N-isobutyl-p-aminophenol. 125 parts of N-isobutyral-p-aminophenol prepared in the above manner, 20 parts of an active nickel on kieselguhr catalyst and 100 parts by volume of toluene were shaken at 110–120° C. under 400–500 lbs./sq. inch hydrogen pressure until no more hydrogen was absorbed. The charge was then cooled and filtered from the catalyst. The filtrate was freed of solvent and the residue was distilled under reduced pressure. The product was N-isobutyl-p-aminophenol as a yellow oil, boiling point 145–165° C./0.5 mm., which promptly solidified and contained 8.49% N. The theory for N-isobutyl-p-aminophenol ($C_{10}H_{15}ON$) is 8.48% N.

Although distillation gives a very pure product, N-isobutyl-p-aminophenol may also be purified through its neutral oxalate salt. This salt was prepared by adding one equivalent of oxalic acid to an alcoholic solution of the crude reduction product and was purified by crystallization from alcohol and from water. The purified salt was obtained as white crystals, M. P. 180–181° C., containing 6.47% N. The theory for N-isobutyl-p-aminophenol neutral oxalate ($C_{22}H_{32}O_6N_2$) is 6.66% N. The purified neutral oxalate salt was converted to the base by the addition of excess sodium carbonate to an aqueous suspension of the salt. The base was isolated by extraction into ether and was crystallized from a mixture of benzene and 30–60° petroleum ether. The purified N-isobutyl-p-aminophenol was obtained as pearl-grey plates, M. P. 79° C.

EXAMPLE 2.—*N-(2-methyl butyral)-p-aminophenol*

47 parts of 2-methyl butyraldehyde was rapidly added with stirring to 66 parts of p-aminophenol suspended in 800 parts by volume of 50% alcohol at 50° C. The reaction mixture was stirred for about five minutes in order to complete the reaction and was then cooled nearly to 0° C., diluted with 400 parts of water and filtered. The precipitate was washed with a little 50% alcohol and dried in a slow stream of air at room temperature. The product was 60 parts of N-(2-methyl butyral)-p-aminophenol as light brown crystals, melting point 94–96° C. The product has the formula

It decomposes slowly in air at room temperature, but may be stored without appreciable alteration for long periods of time in the absence of water vapor and in an inert atmosphere such as nitrogen.

The identity of the product was confirmed by reduction to N-(2-methyl butyl)-p-aminophenol. 50 parts of N-(2-methyl butyral)-p-aminophenol, prepared in the above manner, 0.25 part of platinum oxide catalyst and 150 parts by volume of methanol were shaken in an atmosphere of hydrogen at room temperature until no more hydrogen was absorbed. Preferably, the catalyst is prepared according to the method of Adams, Vorhees and Shriner, Organic Syntheses, vol. XIII, page 92. The reduced reaction mixture was then filtered from the catalyst. The filtrate was freed of solvent by distillation, and the residue was distilled under reduced pressure. The distilled product was 43 parts of N-2-methyl butyl-p-aminophenol as a yellow oil, boiling point 155–165° C. at 0.5 mm. pressure. This product was further purified through its neutral oxalate salt as described in Example 1. The purified salt was obtained as white needles, melting point 186–187° C. with evolution of gas, containing 6.18% N. The theory for N-(2-methyl butyl)-p-aminophenol neutral oxalate ($C_{24}H_{36}O_6N_2$) is 6.24% N. The base was obtained from this salt as pearl-grey plates, melting point 38° C., containing 8.05% N. The theory for N-(2-methyl butyl)-p-aminophenol ($C_{11}H_{17}ON$) is 7.82% N.

EXAMPLE 3.—*N(2-trimethyl acetal)-p-aminophenol*

N(2-trimethyl acetal)-p-aminophenol was prepared and isolated as described in Example 1 from 19 parts of trimethyl acetaldehyde and 22 parts of p-aminophenol in 100 parts by volume of 50% alcohol at room temperature. The dry product was 38 parts of N(2-trimethyl acetal)-p-aminophenol as small white plates, melting point 156–157° C. The product has the formula

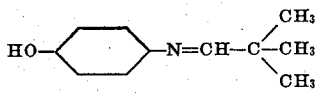

It decomposes slowly on standing in air at room temperature, but may be stored for long periods of time without appreciable alteration in the absence of water vapor and in an inert atmosphere such as nitrogen.

The identity of the product was confirmed by reduction to N(2-trimethyl ethyl)-p-aminophenol. 34 parts of N(2-trimethyl acetal)-p-aminophenol (prepared in the above manner) with 0.25 part of platinum oxide catalyst in 150 parts by volume of methanol was reduced as described in Example 2. The product obtained after removal of catalyst and solvent from the reduction mixture was 33 parts of N(2-trimethyl ethyl)-p-aminophenol. This product was purified through its neutral oxalate salt as described in Example 1. The purified salt was obtained as white needles, melting point 208° C. with gas evolution, containing 6.38% N. The theory for N(2-trimethyl ethyl)-p-aminophenol neutral oxalate ($C_{24}H_{36}O_6N_2$) is 6.24% N. The base was obtained from this salt as light pink crystals, melting point 132° C., containing 7.75% N. The theory for N(2-trimethyl ethyl)-p-aminophenol ($C_{11}H_{17}ON$)

is 7.82% N.

EXAMPLE 4.—*N(2-ethyl butyral)-p-aminophenol*

99 parts of 2-ethyl butyraldehyde and 109 parts of p-aminophenol were mixed in 200 parts by volume of toluene. Toluene and water were then distilled from the reaction mixture, more toluene being added from time to time in order to maintain the volume of the reaction mixture approximately constant. When 200 parts by volume of toluene had been distilled off, 10 parts of 2-ethyl butyraldehyde was added and distillation was continued. When 100 parts by volume of toluene had further distilled off, 10 parts of 2-ethyl butyraldehyde was added and distillation was continued. When 100 parts by volume of toluene had further distilled off, distillation was stopped. 18 parts of water had distilled with the toluene. The warm reaction mixture was filtered. The filtrate was treated with 5 parts of 2-ethyl butyraldehyde, and freed of solvent and excess aldehyde by distillation under reduced pressure. Distillation of the residue in vacuo gave 169 parts of N(2-ethyl butyral)-p-aminophenol as a yellow oil, boiling point 150–180° C./0.5 mm., which solidified on standing and contained 7.42% N. The theory for N(2-ethyl butyral)-p-aminophenol ($C_{12}H_{17}ON$) is 7.33% N. A sample crystallized from a mixture of toluene and 30–60° petroleum ether had the melting point 80–81° C. The product has the formula

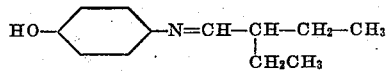

It decomposes slowly on standing in air at room temperature, but may be stored for long periods of time without appreciable alteration in the absence of water vapor and in an inert atmosphere such as nitrogen. Although the use of a solvent as described above is preferable, the product may also be obtained without the use of a solvent. 50 parts of 2-ethyl butyraldehyde and 44 parts of p-aminophenol were mixed at room temperature. The reaction mixture was held at 100° C. for 15 minutes, then freed of water and excess aldehyde by distillation under 200 mm. pressure. The oily residue was dissolved in 100 parts by volume of alcohol, cooled and carefully diluted with water. N(2-ethyl butyral)-p-aminophenol precipitated as a white solid and was filtered off and dried in a slow current of air at room temperature. The product contained 7.46% N.

The identity of the product was confirmed by reduction to N(2-ethyl butyl)-p-aminophenol. 50 parts of N(2-ethyl butyral)-p-aminophenol, prepared by the above methods, with 0.25 g. of platinum oxide catalyst in 150 parts by volume of 95% alcohol was reduced as described in Example 2. The product, after distillation under reduced pressure, was 45 parts of N(2-ethyl butyl)-p-aminophenol as a yellow oil, boiling point 175–180° C./0.5 mm., which promptly crystallized and contained 7.20% N. The theory for N(2-ethyl butyl)-p-amino phenol ($C_{12}H_{19}ON$) is 7.25% N. A sample of the product was purified through its neutral oxalate salt as described in Example 1. The purified salt was obtained as light tan, long needles, melting point 196–197° C. with evolution of gas, containing 5.82% N. The theory for N(2-ethyl butyl)-p-aminophenol neutral oxalate ($C_{26}H_{40}O_6N_2$) is 5.88% N. N(2-ethyl butyl)-p-aminophenol was obtained from this salt as light tan crystals, melting point 95° C.

EXAMPLE 5.—*N(2-methyl pentanal)-p-aminophenol*

The process of Example 4 was repeated, substituting 2-methyl pentanal for 2-ethyl butyraldehyde. 129 parts of N(2-methyl pentanal)-p-aminophenol was obtained as a yellow oil, boiling point 165–185° C./0.5 mm., containing 7.35% N. The theory for N(2-methyl pentanal)-p-aminophenol ($C_{12}H_{17}ON$) is 7.33% N. The product has the formula

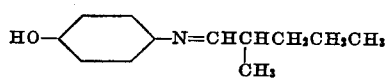

It decomposes slowly on standing in air at room temperature, but may be stored for long periods of time without appreciable alteration in the absence of water vapor and in an inert atmosphere such as nitrogen.

The identity of the product was confirmed by reduction to N(2-methyl pentyl)-p-aminophenol. 50 parts of N(2-methyl pentanal)-p-aminophenol, prepared as described above, with 0.25 part of platinum oxide catalyst in 150 parts by volume of methanol was reduced as described in Example 2. The product, after distillation under reduced pressure, was 43 parts of a yellow oil containing 7.39% N. The theory for N(2-methyl pentyl)-p-aminophenol ($C_{12}H_{19}ON$) is 7.25% N. The product was purified through its neutral oxalate salt as described in Example 1. The purified salt was obtained as white crystals, melting point 188° C. with evolution of gas, containing 5.76% N. The theory for N(2-methyl pentyl)-p-aminophenol neutral oxalate ($C_{26}H_{40}O_6N_2$) is 5.88% N. N(2-methyl pentyl)-p-aminophenol was obtained from this salt as a colorless oil, boiling point 145–149° C./0.5 mm., containing 7.16% N.

EXAMPLE 6.—*N(2-ethyl hexanal)-p-aminophenol*

129 parts of 2-ethyl hexanal, 109 parts of p-aminophenol and 250 parts by volume of toluene were charged into a flask fitted with a reflux system arranged to remove water from the refluxing solvent. The charge was boiled until most of the water had been removed, and 13 parts more of 2-ethyl hexanal was added. The charge was then boiled until no more water was removed by the reflux system, then filtered hot. The total water removed was 18 parts. After addition of 13 parts more of 2-ethyl hexanal, the filtrate was freed of solvent and excess aldehyde by distillation under 200 mm. pressure. The residue was then distilled in vacuo. The product was 163 parts of N(2-ethyl hexanal)-p-aminophenol as a yellow oil, boiling point 185–192° C./0.5 mm., containing 6.50% N. The theory for $C_{14}H_{21}ON$ is 6.39% N. The product has the formula

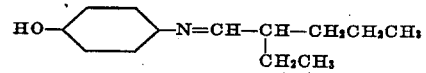

It decomposes slowly on standing in air at room temperature, but may be stored for long periods of time without appreciable alteration in the absence of water vapor and in an inert atmosphere such as nitrogen.

The identity of the product was confirmed by reduction to N(2-ethyl hexyl)-p-aminophenol. 50 parts of N(2-ethyl hexanal)-p-aminophenol prepared as described above with 0.30 part of platinum oxide catalyst in 150 parts by volume of methanol was reduced as described in Example 2. The product, after distillation under reduced pressure, was 47 parts of N(2-ethyl hexyl)-p-aminophenol as a yellow oil containing 6.46% N. The theory for $C_{14}H_{23}ON$ is 6.33%. The product was purified through its neutral oxalate salt as described in Example 1. The salt was obtained as white crystals which melted at 181–182° C. and contained 5.04% N. The theory for N(2-ethyl hexyl)-p-aminophenol neutral oxalate ($C_{30}H_{48}O_6N_2$) is 5.26% N. N(2-ethyl hexyl)-p-aminophenol was obtained from this salt as a pale yellow oil, boiling point 158–162° C./0.5 mm., containing 6.28% N.

EXAMPLE 7.—*N(2-ethyl butyral)-o-aminophenol*

60 parts of 2-ethyl butyraldehyde, 66 parts of o-aminophenol and 200 parts by volume of benzene were charged into a flask fitted with a reflux system arranged to remove water from the refluxing solvent. The charge was boiled until most of the water had been removed, and 6 parts more of 2-ethyl butyraldehyde was added. The charge was then boiled until no more water was removed by the reflux system, then filtered hot. The total water removed was 11 parts. After addition of 4 more parts of 2-ethyl butyraldehyde, the filtrate was freed of solvent and excess aldehyde by distillation under 200 mm. pressure. The residue was then distilled in vacuo. The product was 89 parts of N(2-ethyl butyral)-o-aminophenol as a yellow oil, boiling point 120–145° C./0.5 mm., containing about 1 part of solid material. After filtration from the solid, the liquid contained 7.14% N. The theory for $C_{12}H_{17}ON$ is 7.33% N. The product has the formula

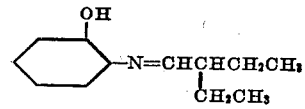

It decomposes slowly on standing in air at room temperature, but may be stored for long periods of time without appreciable alteration in the absence of water vapor and in an inert atmosphere such as nitrogen.

The identity of the product was confirmed by reduction to N(2-ethyl butyl)-o-aminophenol. 50 parts of N(2-ethyl butyral)-o-aminophenol, prepared as described above, with 0.25 part of platinum oxide catalyst in 150 parts of methanol was reduced as described in Example 2. The product was 46 parts of N(2-ethyl butyl)-o-aminophenol as a yellow oil, boiling point 145–150° C., containing 7.07% N. The theory for $C_{12}H_{19}ON$ is 7.25% N.

EXAMPLE 8.—*N-isobutyral-p-aminophenol*

A mixture of 55 g. p-aminophenol and 400 cc. 50% alcohol containing 2 cc. glacial acetic acid was heated to 55° C. Thirty-seven grams of isobutyraldehyde was added all at once with stirring. The reaction mixture heated up spontaneously. On cooling in ice and filtering and washing with 50% alcohol, 57 g. of crystalline 4-isobutyralaminophenol was obtained, melting point 145–148° C.

EXAMPLE 9.—*N-isobutyral-p-aminophenol*

This experiment was carried out identically with that of Example 8 except that 400 cc. of water was used as the solvent instead of 400 cc. of 50% alcohol. The use of 2 cc. acetic acid was repeated. The yield in this experiment was 75 g. (92%) of a product melting at 134–137° C.

EXAMPLE 10.—*N-isobutyl-p-aminophenol*

A mixture of 18.1 g. a-brom-isovaleric acid, 13.6 g. sodium acetate and 10.9 g. p-aminophenol in 50 cc. of water was heated under reflux for five hours. The pasty mass, which first formed, rapidly dissolved. On cooling, several grams of a colorless solid was deposited, which was then filtered off. The solid melted indefinitely and evolved gas when heated above 160° C.

The solid compound, presumably a-(p-hydroxyphenyl-amino)-isovaleric acid, was heated in a beaker over an open flame until no more gas was evolved. The residue was extracted with warm petroleum ether. On filtration and cooling the solution deposited colorless crystals which melted at 75° C. This product was N-isobutyl-p-aminophenol.

While in the above examples, I have disclosed the preparation of derivatives of para-aminophenol, the corresponding derivatives of ortho-aminophenol and the amino-cresols, such as 4-amino-2-cresol, representative compounds being as follows:

N-(isobutyral)-o-aminophenol
N-(2-methylbutyral)-o-aminophenol
N-(2-trimethyl acetal)-o-aminophenol
N-(2-ethylbutyral)-o-aminophenol
N-(2-methyl-pentanal)-o-aminophenol
N-(2-ethyl hexanal)-o-aminophenol
N-(isobutyl)-o-aminophenol
N-(2-methyl-butyl)-o-aminophenol
N-(2-trimethyl-ethyl)-o-aminophenol
N-(2-ethylbutyl)-o-aminophenol
N-(2-methyl-pentyl)-o-aminophenol
N-(2-ethylhexyl)-o-aminophenol
N-(isobutyral)-4-amino-2-cresol
N-(2-methylbutyral)-4-amino-2-cresol
N-(2-trimethyl acetal)-4-amino-2-cresol
N-(2-ethylbutyral)-4-amino-2-cresol
N-(2-methyl-pentanal)-4-amino-2-cresol
N-(2-ethyl hexanal)-4-amino-2-cresol
N-(isobutyl)-4-amino-2-cresol
N-(2-methyl-butyl)-4-amino-2-cresol
N-(2-trimethyl-ethyl)-4-amino-2-cresol
N-(2-ethylbutyl)-4-amino-2-cresol
N-(2-methyl-pentyl)-4-amino-2-cresol
N-(2-ethylhexyl)-4-amino-2-cresol may be prepared by the same method, starting with ortho-aminophenol. Likewise, corresponding derivatives of other aminophenols containing alkyl substituents in the ring, aminonaphthols, aminoanthranols and the like may be prepared by the same method. Also, higher homologs may be produced by employing higher a-isoalkyl-aldehydes. Further, mixtures of aldehydes may be condensed with any primary aminophenol, or with a mixture of two or more different primary aminophenols and any aldehyde may be condensed with a mixture of two or more aminophenols to produce corresponding mixtures of alkylidene aminophenols.

In carrying out the reaction, the aldehyde may be added to the aminophenol or the aminophenol may be added to the aldehyde. It is usually preferable, however, to add the aldehyde to the aminophenol in order to decrease the possibility of polymerization of the aldehyde prior to reaction with the aminophenol. Also, the reaction is preferably accomplished under substantially neutral conditions. Large amounts of acids or alkalies should be avoided, since they promote polymerization, hydrolysis, and other secondary reactions. The acid or alkali, when employed, should be preferably kept below 1%, based on the solvent. The amount of acid normally found in commercial aldehydes is not sufficient to cause appreciable secondary reactions and therefore it is generally not necessary to distill or otherwise purify the commercial aldehydes in order to obtain good results in my invention.

Isolation of the final products is preferably accomplished by precipitation and filtration, or through removal of the solvents by distillation, but may be accomplished by other suitable means, such as solvent extraction. The alkylidene aminophenols are preferably removed from the reaction mixture as soon as possible after formation. The alkylidene aminophenols may be purified by crystallization or distillation. In the case of distillation, it is desirable that all water be removed prior to distillation. This can be readily accomplished by distilling off the water with an immiscible solvent such as benzene or toluene. When the N-alkylidene aminophenols are isolated by precipitation and filtration, they may be conveniently dried in a slow stream of air. However, the last traces of water vapor are preferably removed by subjecting the air-dried substance to a reduced pressure, particularly when it is desired to store the materials for any substantial period of time. When the N-alkylidene-aminophenols are purified by distillation under reduced pressure, further drying is unnecessary prior to storage. It is preferred to store the alkylidene aminophenols in the absence of water vapor and in an inert atmosphere so as to prevent hydrolysis and/or oxidation during storage.

The N-alkylidene aminophenols of my invention, as obtained by my process, are well characterized chemical individuals easily recognized as N-alkylidene-aminophenols. They reduce cleanly to give N-alkyl-aminophenols in excellent yields and substantially free from by-products. They and the corresponding alkyl-aminophenols are useful as anti-oxidants for gasoline, rubber, fats, fatty oils and similar auto-oxidizable materials.

While I have disclosed the preferred embodiments of my invention and the preferred modes of carrying the same into effect, it will be understood that such disclosure is illustrative only and it will be readily apparent that many variations may be made therein without departing from the spirit of my invention. Accordingly, the scope of my invention is to be limited solely by the appended claims construed as broadly as is permissible in view of the prior art.

I claim:

1. An N-(alpha-isoalkylidene)-aminophenol.
2. An N-(alpha-isoalkylidene)-aminophenol of the benzene series.
3. An N-(alpha-isoalkylidene)-p-aminophenol of the benzene series.

4. An N-isobutylidene-aminophenol.

5. N-isobutylidene-p-aminophenol.

6. The method of preparing an N-(alpha-isoalkylidene)-aminophenol which comprises condensing 1 mol of an alpha-isoalkyl aldehyde with 1 mol of a primary aminophenol in a solvent.

7. The method of preparing an N-(alpha-isoalkylidene)-aminophenol which comprises condensing 1 mol of an alpha-isoalkyl aldehyde with 1 mol of a primary aminophenol in an aqueous solvent.

8. The method of preparing an N-(alpha-isoalkylidene)-aminophenol which comprises condensing 1 mol of an alpha-isoalkyl aldehyde with 1 mol of a primary aminophenol in a solvent at temperatures below 125° C.

9. An N-(alpha-isoalkylidene)-aminophenol which, except for the amino nitrogen and hydroxyl oxygen atoms, consists of carbon and hydrogen.

10. An N-(alpha-isoalkylidene)-aminophenol of the benzene series which, except for the nitrogen of the amino group and the oxygen of the hydroxyl group, consists of carbon and hydrogen.

11. An N-(alpha-isoalkylidene)-p-aminophenol of the benzene series which, except for the nitrogen of the amino group and the oxygen of the hydroxyl group, consists of carbon and hydrogen.

12. N-(2-methyl butyral)-p-aminophenol.

13. N-(2-methyl pentanal)-p-aminophenol.

RICHARD G. CLARKSON.